Patented May 20, 1941

2,242,681

UNITED STATES PATENT OFFICE 2,242,681

TANNING SUBSTANCES AND THEIR MANUFACTURE

Josef Schäfer, Riehen, near Basel, and Robert Biedermann, Basel, Switzerland, assignors to the firm of J. R. Geigy S. A., Basel, Switzerland No Drawing. Application February 7, 1938, Serial No. 189,262. In Switzerland February 10, 1937

6 Claims. (Cl. 260—45)

The U. S. Patent No. 1,841,840 discloses a process for condensing phenolsulphonic acids with urea and formaldehyde or their condensation products to synthetic tanning substances. In transferring this reaction from phenolsulphonic acids on to mixtures of phenolsulphonic acids and the difficultly soluble dihydroxydiphenylsulphones, as improvement to the U. S. Patent No. 1,901,536, there will be obtained insoluble, technically valueless final products.

Now it has been found that, nevertheless, one surprisingly succeeds in obtaining valuable, soluble tanning substances by combining mixtures of phenolsulphonic acids and dihydroxydiphenylsulphones with urea and formaldehyde or their condensation products, if the reaction is conducted under certain determined operative conditions. Thus the concentration relations of the reaction mixture have proved to be important; not less important is the reaction temperature; indeed, only temperatures up to 50° C. give rise to soluble condensation products; at higher temperatures insoluble resins will be obtained. If in respect to the concentration only so much water is added to the reaction mixture until at the used reaction temperature there results a stirrable mass—the original reaction mixture of phenolsulphonic acid and dihydroxydiphenylsulphone is at about 40° C. a non-stirrable, tough mass—the new reaction of condensation proceeds smoothly and results in the production of valuable soluble tanning substances fast to light.

The composition of the reaction mixture is governed by the following conditions. In each case the proportion of urea to formaldehyde must be 1 molecule of urea to at least 2 molecules of formaldehyde. According to the higher or lower reactivity of the used aromatic sulphonic acids (for example the phenol- or naphthalenesulphonic acids) or the dihydroxydiphenylsulphones the proportion of formaldehyde to urea or the quantity of their used condensation products (whereby in this case, if desired, formaldehyde or urea may still be added) must be kept greater or smaller. In this selective control it has been found that on increasing the urea quantity above a determined proportion of urea to formaldehyde or on increasing the dihydroxydiphenylsulphone amount, there may rather be obtained insoluble final products. To avoid such undue procedure it is advantageous to perform the condensation in presence of higher or lower quantities of aromatic sulphonic acids or their formaldehyde condensation products as solvent or dispersing agent. The aforesaid different reactivity of the aromatic sulphonic acids, such as the phenolsulphonic acids, or of the dihydroxydiphenylsulphones depends on their contents of homologues or isomeric compounds; thus in using for instance phenolsulphonic acid—dihydroxydiphenyl-and-dicresylsulphone mixtures it is possible to increase the urea content with an increasing content of m-cresol.

The condensation with urea and formaldehyde can be performed in such a manner that one dissolves the urea in the formaldehyde and slowly adds this solution to the condensation mixture containing the aromatic sulphonic acid and the dihydroxydiphenylsulphone without previously condensing the urea with the formaldehyde. But, one can also cautiously concentrate the reaction mixture of urea and formaldehyde in a vacuum, which allows the mixture of dihydroxydiphenylsulphone and aromatic sulphonic acid to be used in less concentrated form.

Finally, it is also possible to add solid, stabilized urea-formaldehyde condensation products, which may be added in powdered form to the reaction mixture. The alkaline condensation products of urea and formaldehyde, the use of which for the production of tanning substances is disclosed in the British Patent 388,475, are also usable for the manufacture of tanning substances according to the improved process.

The leathers and skins treated with the improved tanning substances are distinguished by a better white, a greater fullness and a considerably enhanced fastness to light in comparison to leathers or skins treated with known tanning substances obtained by condensation without addition of urea.

The following examples, without being limitative, illustrate the invention, the parts being by weight.

*Example 1*

200 parts of crude cresol consisting of a mixture of ortho-, para- and metacresol are sulphonated during 1 hour at 105° C. with 200 parts of monohydrate and the sulphonation water is distilled off in a vacuum. Into this mixture there are then slowly sucked in at reduced pressure at an inner temperature of 125–130° C. 100 parts of crude cresol of the kind above referred to so that the same enters through a narrow tube below the surface of the mixture, in order to convert about 40 per cent of the cresol sulphonic acid into dihydroxydicresylsulphone. After all of the crude cresol has thus been introduced into the mass, the reaction water and the excess of crude cresol are distilled off.

Then there is added at ordinary pressure to 100 parts of the above mixture, which are previously diluted with 20 parts of water, by gradual admixture and without allowing the temperature to rise above 40–45° C., 26 parts of a urea-formaldehyde condensation product which is obtained by a 2 hours heating of 40 parts of formaldehyde of 30 per cent strength, 6 parts of urea and 1 part of tartaric acid and concentration of the mass in a vacuum to 26 parts. The reaction mixture is so long stirred at 30–40° C. until a test has become clearly soluble in water. Thereupon it is diluted with water and adjusted by means of caustic soda lye or ammonia to the acidity required in tanning operation.

Instead of the above said urea-formaldehyde condensation product there may also be employed a condensation product which is obtained by heating together during 2 hours 40 parts of formaldehyde of 30 per cent strength, 8 parts of urea and 1 part of lactic acid of 45 per cent strength. Instead of concentrating the mass by evaporation, the quantity of water required for diluting the dihydroxydicresylsulphone-crude cresol sulphonic acid mixture may also be reduced to 10 parts.

Example 2

100 parts of a cresolsulphonic acid-dihydroxydicresylsulphone mixture, prepared according to Example 1 with the exception that 100 parts of crude m-cresol containing 70–80 per cent of m-cresol are sucked in into the sulphonation mass, are diluted with 10 parts of water and thereto are then gradually added at 40–45° C. 52 parts of a paste-like urea-formaldehyde condensation product (obtained by a two-hours boiling on the reflux condenser of 40 parts of formaldehyde of 30 per cent strength, 10.2 parts of urea and 1.8 parts of lactic acid of 45 per cent strength) without allowing the temperature to rise above 45° C. The condensation is continued over night at the same temperature and the reaction mass is diluted the next day, after it has become soluble in water, with a certain quantity of water and adjusted by means of an alkali lye to the required acidity.

Example 3

150 parts of a condensation product obtained by a 2 hours heating of 80 parts of naphthalenesulphonic acid, 10 parts of 4:4'-dihydroxydiphenylsulphone, 8 parts of water and 16 parts of formaldehyde of 30 per cent strength to 115° C. and an adjustment with water to 150 parts, are intermixed first with 50 parts of a dihydroxydiphenylsulphone mixture prepared according to Example 1 but with the modification that 200 parts of phenol are sucked in instead of 100 parts of crude cresol, and then with 15 parts of a urea-formaldehyde condensation product concentrated by evaporation, obtained by a 2 hours' boiling of 40 parts of formaldehyde of 30 per cent strength, 6 parts of urea and 1 part of lactic acid of 45 per cent strength and concentration of the mass to 26 parts, and to which after the condensation 3.75 parts of urea have still been added. The condensation is performed at about 40° C. until a test has proved to be well soluble in water and then the condensation mass is adjusted with water and caustic soda lye to the desired dilution and acidity.

Instead of the aforesaid urea-formaldehyde condensation product it is also possible to use here a product prepared in alkaline solution according to British Patent 388,475.

The above mentioned quantity of the dihydroxy-diphenylsulphone mixture can also be doubled; in this case the condensation is performed with 30 parts of the urea-formaldehyde condensation product concentrated by evaporation, to which after the condensation 7.5 parts of urea are still added. For the rest, the procedure is the same as above.

Example 4

200 parts of a condensation product obtained by a 6 hours' heating of 150 parts of naphthalenesulphonic acid and 25 parts of formaldehyde of 30 per cent strength and dilution to 200 parts, are intermixed with 50 parts of a dihydroxydiphenylsulphone-phenol-sulphonic acid mixture obtained as in Example 1, but with the modification that in this case double the quantity of crude cresol is sucked in, and the mass is condensed at 40° C. with 24 parts of a urea-formaldehyde condensation product prepared by a 2 hours' boiling of 40 parts of formaldehyde of 30 per cent strength, 6 parts of urea and 1 part of lactic acid of 45 per cent strength. The working up takes place as described in the foregoing examples.

The new tanning agents show in solution the usual characteristics of precipitation with ferric chloride and of precipitating gelatine.

What we claim is:

1. In the manufacture of tanning substances by heating in acid solution a dihydroxydiarylsulphone in the presence of at least one of the group consisting of an aromatic sulphonic acid and a formaldehyde-condensation product of an aromatic sulphonic acid, the improvement which consists in carrying out such reaction at temperatures substantially not above 50° C., in the presence of a member of the group consisting of (a) a condensation product of urea and formaldehyde made from the components in the ratio of 1 molecule of urea to at least 2 molecules of formaldehyde, and (b) a mixture of urea and formaldehyde containing the components in the ratio of 1 molecule of urea to at least 2 molecules of formaldehyde, and also in the presence of a quantity of water only sufficient to render the reaction mass stirrable.

2. In the manufacture of tanning substances by heating in acid solution a dihydroxydiarylsulphone in the presence of at least one of the group consisting of an aromatic sulphonic acid and a formaldehyde-condensation product thereof, the improvement which consists in carrying out such reaction at temperatures substantially not above 50° C., in the presence of a condensation product of urea and formaldehyde made from the components in the ratio of 1 molecule of urea to at least 2 molecules of formaldehyde and also in the presence of a quantity of water only sufficient to render the reaction mass stirrable.

3. A process for the manufacture of tanning substances which comprises condensing in acid solution at temperatures substantially not above 50° C., a dihydroxyditolylsulphone (obtained from crude cresol-sulphonic acid and crude cresol) with a sulphonic acid of the same crude cresol and a condensation product of urea and formaldehyde obtained by heating 1 molecule of urea and 4 molecules of formaldehyde in tartaric acid solution, and also in the presence of a quantity of water only sufficient to render the reaction mass stirrable.

4. A process for the manufacture of tanning substances which comprises condensing in acid solution at temperatures substantially not above 50° C., the dihydroxyphenyltolylsulphone (obtained from crude cresol-sulphonic acid and phenol) with crude cresol sulphonic acid in the presence of a condensation product of urea and formaldehyde made from the components in the ratio of 1 molecule of urea to at least 2 molecules of formaldehyde and containing an excess of uncombined urea which is added after the condensation of urea and formaldehyde and also in the presence of the condensation product made from naphthalenesulphonic acid, formaldehyde and dihydroxydiphenylsulphone, and also in the presence of a quantity of water only sufficient to render the reaction mass stirrable.

5. A process for the manufacture of tanning substances which comprises condensing in acid solution at temperatures substantially not above 50° C., the dihydroxyditolylsulphone (obtained from crude cresol-sulphonic acid and crude cresol) with crude cresol sulphonic acid in the presence of a condensation product made from naphthalenesulphonic acid and formaldehyde, and also in presence of a condensation product of urea and formaldehyde made from the components in the ratio of 1 molecule of urea to at least 2 molecules of formaldehyde, and also in the presence of a quantity of water only sufficient to render the reaction mass stirrable.

6. As tanning substances, the products identical with the products obtained according to the process recited in claim 1.

JOSEF SCHÄFER.
ROBERT BIEDERMANN.